(No Model.) 4 Sheets—Sheet 1.

J. BURKHARDT.
ACHINE FOR IMPRESSING ORNAMENTAL DESIGNS UPON METALLIC TUBING.

No. 461,812. Patented Oct. 27, 1891.

Witnesses:
Charles R. Searle
J. W. Lautry

Inventor:
John Burkhardt
By
H. P. K. Peck
Attorney (No Model.)

J. BURKHARDT.
MACHINE FOR IMPRESSING ORNAMENTAL DESIGNS UPON METALLIC TUBING.

No. 461,812.

4 Sheets—Sheet 2.

Patented Oct. 27, 1891.

Witnesses:
Charles R. Searle.
J. W. Lantry

Inventor:
John Burkhardt
By H. P. K. Peck.
Attorney (No Model.)  4 Sheets—Sheet 3.

J. BURKHARDT.
MACHINE FOR IMPRESSING ORNAMENTAL DESIGNS UPON METALLIC TUBING.

No. 461,812. Patented Oct. 27, 1891.

Witnesses
Charles R. Searle
J. W. Lautry

Inventor:
John Burkhardt
By
H. P. K. Peck
Attorney (No Model.) 4 Sheets—Sheet 4.
J. BURKHARDT.
MACHINE FOR IMPRESSING ORNAMENTAL DESIGNS UPON METALLIC TUBING.
No. 461,812. Patented Oct. 27, 1891.
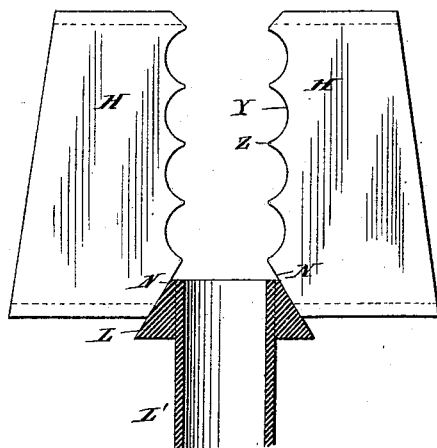
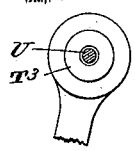
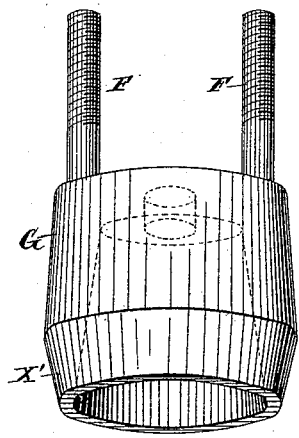
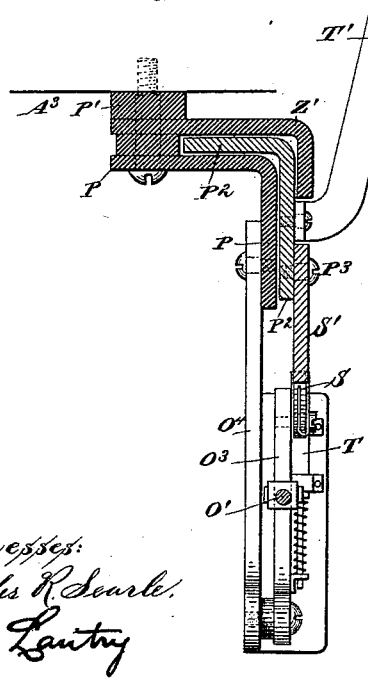
Witnesses:
Charles R. Searle
J. W. Lantry
Inventor:
John Burkhardt
By
H. P. K. Peck
Attorney

UNITED STATES PATENT OFFICE.

JOHN BURKHARDT, OF NEW YORK, N. Y., ASSIGNOR TO WILLIAM H. JACKSON & CO., OF SAME PLACE.

MACHINE FOR IMPRESSING ORNAMENTAL DESIGNS UPON METALLIC TUBING.

SPECIFICATION forming part of Letters Patent No. 461,812, dated October 27, 1891.

Application filed May 13, 1891. Serial No. 392,614. (No model.)

*To all whom it may concern:*

Be it known that I, JOHN BURKHARDT, a citizen of the United States, residing at New York, in the county of New York and State of New York, have invented certain new and useful Improvements in Machines for Impressing Ornamental Designs or Forms upon Metallic Tubing; and I do hereby declare the following to be a full, clear, and exact description of the invention, such as will enable others skilled in the art to which it appertains to make and use the same, reference being had to the accompanying drawings, forming a part of this specification.

Figure 1:
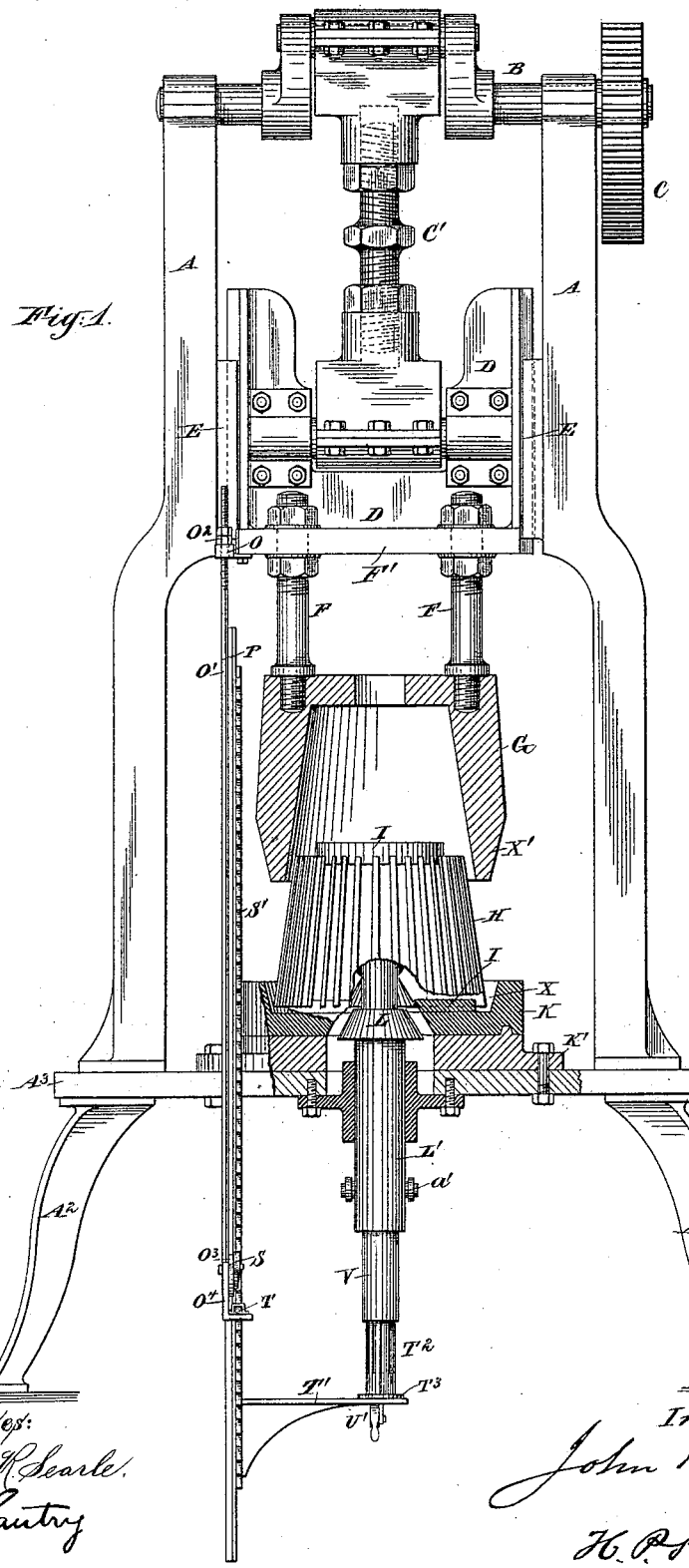
Figure 2:
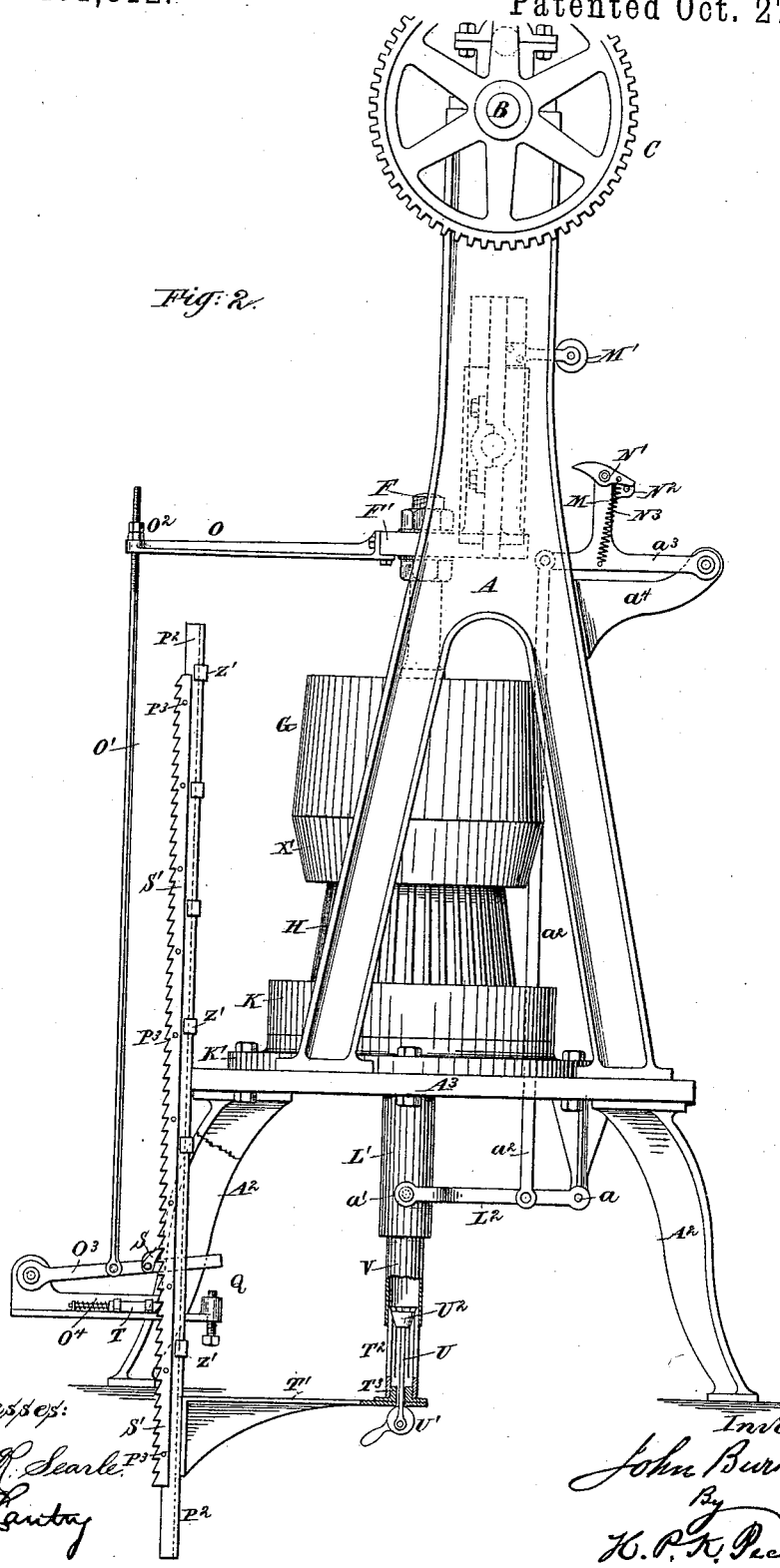
Figure 3:
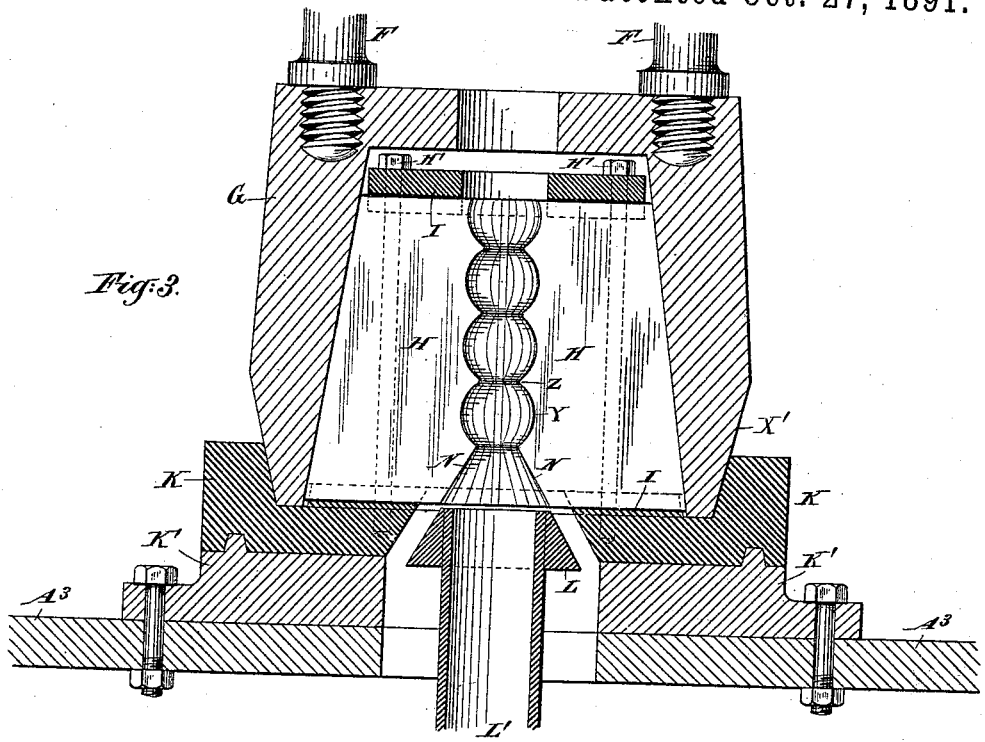
Figure 4:
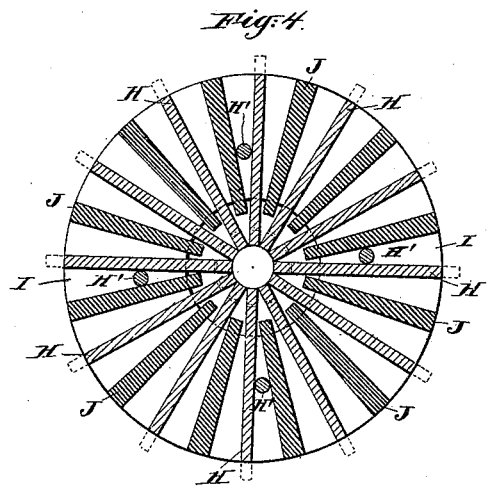

Figure 1 represents a front elevation of the body of the machine and exhibits the die-plate actuator and die-plate-frame supporter in vertical section. Fig. 2 represents a side elevation of the same. Fig. 3 represents an enlarged vertical section of the die-plates in working position and their immediate connections as arranged in the machine. Fig. 4 represents a transverse section of the die-plates and one of the annular grooved disks between which they work and are guided, and exhibits in section the intermediate studs and bolts which serve to form the frame which holds the die-plates. Fig. 5 represents a side view of two of the die-plates detached and the cone and its cylindrical holder, which serve to open the die-plates after each compression of the press. Fig. 6 represents a perspective view of the die-plate actuator detached, and Fig. 7 represents a transverse section of the guide-plates and carrier of the serrated feeding-bar.

My invention relates to certain improvements on the mechanism described in my patent dated March 26, 1889, numbered 400,394; and it consists in certain auxiliary devices and in the combination of mechanism for automatically feeding a tube intermittently to the action of the die-plates and in the means of communicating positive motion to automatically operating mechanism at regular intervals to open the die-plates, as hereinafter more fully set forth.

In the accompanying drawings, A denotes the main frame of the machine supported on tables $A^3$ and legs $A^2$. The crank-shaft B is journaled in said main frame and is provided with a gear wheel or pulley C. The jointed adjustable pitman C' connects the crank-shaft B to the plunger D, and the latter is guided in grooved ways E, secured to the inner sides of frame A. The actuator G is secured to the flange F' of the plunger D by the adjustable screw-bolts F.

The die-plates H are arranged to form a circle standing vertically between their grooved guiding-disks I I, which are held in proper relation to each other by means of the upright studs J and screw-rods H', the distance between the disks I I being just sufficient to allow the die-plates to work freely toward and from the center. The die-plates are formed of uniform size and shape and their outer edges are acted upon as inclined planes by the actuator G. They increase in width from their upper to their lower ends, as represented in Fig. 5. The inner working edges of the die-plates shown are scalloped to form corresponding impressions upon a tube on which they will act.

A variety of designs may be formed upon tubing by the use of die-plates having different configurations on their working edges, and series of such variously-formed die-plates may from time to time be substituted for each other to produce different designs.

The grooved disks I I, (which have a central opening,) studs J, and screw-rods H' form the die-plate frame, seated upon the annular plate K, having a base K' resting upon table $A^3$. A portion of the inner lower edges of the several die-plates are formed with outwardly-inclined planes at N, corresponding with the shape of the cone L, which serves to open or spread them apart after each compressive action, which forces them together around the tube. The cone L is attached to the hollow shaft or holder L', and it in turn connects pivotally with lever $L^2$, and the latter extends outwardly near to one of the legs $A^2$ and it is pivoted at $a$. Between the pivots $a$ and $a'$ of the lever $L^2$ the actuating-rod $a^2$ is pivoted to it and extends upward and is pivoted with the tilting arm $a^3$, and the latter is pivotally secured to the fixed arm $a^4$, secured to the table $A^3$. As a part of arm $a^3$ the standard M projects and is provided at its upper end with a tumbler N', pivoted thereto, and this tumbler normally rests against a stop N², being held by the spring N³. The roller M' works on a pivot that connects it to the rear of the plunger D, and when the plunger D descends roller M' tilts the tumbler N' in passing it; but the spring N³ returns it to its normal position, and when plunger D rises roller M' strikes tumbler N' in passing and lifts tilting arm a³, rod a², and the inner end of lever L², which is pivoted to the hollow cone-holder L' and forces the annular cone L at its top against the inclined inner edges N of the die-plates and opens the series of die-plates to allow the tube being wrought upon to be fed upwardly, as hereinafter explained. The end of lever L² is formed as a loop, through which hollow cone-holder L' passes and to which it is pivoted, as before stated.

There is a continuous vertical opening in the center of the machine, through which a tube to be acted upon by the die-plates will freely pass as it is fed upward by the mechanism which will now be described.

An arm O, secured to the plunger D, projects out in front, having a hole through which rod O' freely works. This rod is provided with an adjusting-screw nut O² and extends down and is pivoted to lever O³, which in turn is pivoted to a fixed arm O⁴. The lever O³ is provided with a spring-pawl S, which engages in the serrations formed in feeding-bar S', the latter being retained in a vertical position by means of the angular guide P, secured to the table at P' and shown in longitudinal section in Fig. 7. The angular guide P for the feeding-bar S' extends down below the bottom of the machine and is provided with a correspondingly-formed sliding angular bar P², to which the serrated feeding bar S' is attached by the screws P³. The sliding bar P² is held in its relation to the fixed guiding-bar P by clasps Z'. The inner end of the fixed arm O⁴ has a set screw Q, which may be adjusted under the inner end of lever O³ to regulate the extent of the vertical movement of the latter, and thereby determine the extent of each intermittent feed motion. This provision is made to enable the use of feeding-bars with serrations at greater or less distances apart for the purpose of admitting of the substitution of die-plates having longer or shorter undulations or depressions—that is to say, having projections or depressions at greater or less distances apart. Arm O in ascending strikes nut O² and raises the rod O' and its connected feed mechanism. When the pawl S is released from its engagement with the feed-bar S', after having elevated it as indicated, the spring-bolt T, attached to fixed arm O⁴, will catch into one of the serrations of feed-bar S' and prevent it from descending. The arm T' is bolted to the sliding angular bar P² and partakes of its motions, and its inner end extends to the center of the opening, through which a tube to be acted upon is passed, and it is mounted with a split hollow tube-holder T², secured within the seat T³, fastened to said arm T. The rod U, located within the split tube-holder T², is provided with the eccentric lever U' at its lower end and its upper end terminates with an inverted cone U². The tube to be acted upon may be inserted from either above or below the machine and its lower end will come down around the upper end of the split tube-holder P², when by the movement of the eccentric lever U' the inverted cone U² will be forced down into the upper end of the split tube-holder and cause it to spread and impinge against the inner surface of the tube V and hold it while being fed upward.

The annular plate K on which the die-plate frame rests is provided with a continuous inclined flange X, corresponding on its inner face with the inclined outer surface X' of the die-plate actuator G, and when the plunger D descends, causing the actuator G to force the series of die-plates inwardly to form an impression upon a tube, (inserted at their center in the machine to receive its action,) the lower beveled outer face X' of the actuator will pass down within the inclined flange X and assure accuracy of the operation.

From the foregoing description it will be seen that the inner scalloped or indented edges of the die-plates H will form a complete ring or circle when forced inwardly to the full extent of their action around a tube, so as to act upon its entire perimeter, occupying for the time being the opening through their center; also, that sets or series of die-plates having different designs or shapes formed on their working inner edges may be used in the machine, and that the feeding mechanism may be adjusted to accommodate the use of such die-plates, whether their undulations or projections, as seen at Y Z in Fig. 5, are at greater or less distances apart.

To receive the action of the machine to impress figures or designs upon metallic tubes, the latter will be inserted through the opening in the center of the machine and be supported at the end of the split tube-holder U by means of the inverted cone U², which is actuated by the eccentric lever U', as above indicated. The vertical movements of the plunger D, carrying arm O, will cause its descent without acting upon the feeding mechanism, because rod O' will freely pass through the hole in the end of said arm O; but when the plunger ascends arm O will act upon nut O² and elevate rod O' and it will elevate O³, causing pawl S to engage in the toothed feed-bar S' and raise it to the extent of the distance from one tooth to the next, and when pawl S is released the spring-bolt T, attached to fixed arm O⁴, that works in a grooved way, will catch into the toothed bar S' and retain it from descending until the next upward movement is produced by the action of the feed mechanism. The angular bar P², to which the toothed bar S' is secured, carries the arm T', which extends inwardly directly under the tube-holder T² and supports it, and at each upward movement of the feeding mechanism just described the tube-holder T² and the tube V, which it holds, as specified, will necessarily be carried up to the same extent that the toothed bar S' ascends at each operation, and this will elevate the tube a distance equal to the distance between the indentation Y, formed on the working edges of the die-plates H, and immediately before each operation of giving one feed action to the tube the plunger D, which carries roller M', will in its ascent cause said roller to act on tumbler N' and move hinged arm $a^3$ upward sufficiently through its connection to force cone L into the inclined opening at the bottom of the die-plates and open them sufficiently to allow the tube to be fed upward, as explained. The arrangement of the plunger D and its connections is such as not to interfere with the passage of a tube of greater length than the height of the machine up through the continuous passage, which extends centrally through the circle of die-plates.

It should be observed that the angular guide P and the support P², which travels with the serrated feeding-bar S', to which it is attached, are shown more clearly in horizontal section, Fig. 7.

Having fully described my invention, I claim and desire to secure by Letters Patent—

1. In a machine for impressing ornamental designs upon metallic tubes, a set or series of tapering die-plates arranged to form a circle supported in vertical position and guided by grooved disks, in combination with a die-plate actuator for closing the die-plates, having its interior formed to correspond with the tapering exterior form of the set of die-plates, and a cone-shaped die-plate opener, as described.

2. In a machine for forming ornamental impressions on the perimeters of tubes, the automatic tube-feeding mechanism, substantially comprising the combination of the plunger D, arm O, rod O', pivoted lever O³, spring-pawl S, arm O⁴, spring-catch bolt T, serrated feeding-bar S', working in guides, arm T', split tube-holder T², inverted cone U², rod U, and eccentric U', as described.

3. In a machine organized as described, the automatic die-plate-opening mechanism substantially comprising the combination of the plunger D, provided with roller M', tilting arm $a'$, provided with standard M, furnished with spring-tumbler N', connecting-rod $a^2$, pivoted lever L², supporting-tube L', and cone L, which acts upon the inclined inner edges N of die-plates H, as described.

4. In a machine for impressing ornamental figures on tubes, a series of scalloped or indented die-plates arranged to form a circle and supported and guided between annular grooved disks, and a die-plate actuator for closing the dies around a tube, in combination with a cone-shaped die-plate opener actuated by the movements of a plunger of a press, as specified.

5. In a machine for impressing designs on metallic tubes, the plunger D, in combination with the actuator G, the set of die-plates H, grooved disks I I, flanged annular plate K, having a base K', and the table A³, substantially as described.

6. In the machine, substantially as described, the combination of the tool-holding mechanism comprising the split cylindrical tube-holder T², the rod U, cone-shaped spreader U², and eccentric lever U', as specified.

7. In the machine for impressing designs on metallic tubes, the plunger D, arm O, rod O', lever O³, serrated feeding-bar S', arm T', tube-holder T², cone-shaped spreader U², and their intermediate connections for feeding a tube through the machine, in combination with the roller M', tilting arm $a'$, connecting-rod $a^2$, pivoted lever L², cone-shaped die-plate opener L, and their intermediate connections for opening the die-plates, substantially as specified.

8. In a machine for forming ornamental designs on the perimeters of tubes, the carrying and guiding mechanism for feeding the tube intermittently to the action of the die-plates, comprising the combination of the serrated feed-bar S', the angular sliding bar P², to which the latter is secured, the fixed angular guide-bar P, secured to the table, and the guiding-loops Z', attached to the fixed angular bar P, as described.

In testimony that I claim the invention above set forth I have affixed my signature in presence of two witnesses.

JOHN BURKHARDT.

Witnesses:
H. P. K. PECK,
WALTER E. WOODFORD.